US005775317A

United States Patent [19]

Finke

[11] Patent Number: 5,775,317

[45] Date of Patent: Jul. 7, 1998

[54] RECUPERATIVE RADIANT TUBE WITH HOT SIDE VITIATION

[75] Inventor: Harry P. Finke, Pittsburgh, Pa.

[73] Assignee: Bloom Engineering Company, Inc., Pittsburgh, Pa.

[21] Appl. No.: 705,776

[22] Filed: Aug. 30, 1996

[51] Int. Cl.$^{6}$ .................... F23D 21/00

[52] U.S. Cl. .................... 126/91 A; 431/11; 431/215; 431/115; 432/209

[58] Field of Search .................... 431/215, 211, 431/115, 116, 11; 126/91 A; 432/181, 209, 212, 180; 165/4, 108, 909, DIG. 364

[56] References Cited

U.S. PATENT DOCUMENTS

| | | | |
|---|---|---|---|
| 3,079,910 | 3/1963 | Bloom et al. | 126/91 |
| 3,262,484 | 7/1966 | Hess | 158/7.6 |
| 3,397,028 | 8/1968 | Brauer | 431/115 |
| 3,908,628 | 9/1975 | Lazaridis et al. | 126/91 |
| 3,920,383 | 11/1975 | Kerr | 432/223 |
| 4,310,303 | 1/1982 | Collier | 432/209 |
| 4,445,842 | 5/1984 | Syska | 431/115 |
| 4,479,535 | 10/1984 | Echigo et al. | 165/142 |
| 4,524,752 | 6/1985 | Clarke | 126/91 |
| 4,601,655 | 7/1986 | Riley et al. | 431/116 |
| 4,673,348 | 6/1987 | Riley et al. | 431/115 |
| 4,800,866 | 1/1989 | Finke | 126/91 |
| 5,304,059 | 4/1994 | Tanaka et al. | 431/170 |

FOREIGN PATENT DOCUMENTS

| | | | |
|---|---|---|---|
| 52-44805 | 11/1977 | Japan . | |
| 53-69932 | 6/1978 | Japan . | |
| 0107811 | 8/1980 | Japan | 431/116 |
| 56-12904 | 2/1981 | Japan . | |
| 0926429 | 5/1982 | U.S.S.R. | 126/91 A |

OTHER PUBLICATIONS

All-Union Scientific-Research Instituteof the Gas Industry, New Gas Radiant Tubes, E. V. Kreinen, No. 5, pp. 23–26 (Translated from Metallovedenie I Termicheskaya Obrabotka Metallov) Nov. 1978.

*Primary Examiner*—Carl D. Price

*Attorney, Agent, or Firm*—Webb Ziesenheim Bruening Logsdon Orkin & Hanson, P.C.

[57] ABSTRACT

A radiant tube assembly includes a radiant tube having a burner leg with a burner therein, an exhaust leg and a connector leg. A recuperator is located inside the exhaust leg in a stream of products of combustion flowing through the exhaust leg. The recuperator has an air inlet port at the outer end and a mixing baffle at the inner end. The mixing baffle causes combustion air and products of combustion to be mixed at the inner end of the recuperator and the mixture is supplied to the burner for combustion.

21 Claims, 3 Drawing Sheets

1
2
14
28
4
10
80
94
126
6
8
22
42
48
60
70
34
30
36
38
64
32
40
62
50
54
16
12
20
18

RECUPERATIVE RADIANT TUBE WITH HOT SIDE VITIATION

FIELD OF THE INVENTION

The present invention relates generally to radiant tube burners and more particularly to recuperative radiant tube burners which utilize vitiation to reduce NOX emissions.

DESCRIPTION OF THE PRIOR ART

The need to minimize the formation of oxides of nitrogen during combustion has become a requirement of many applications of fire heaters, boilers, oil field steamers, and the like. That requirement also applies to heat treating furnaces and other applications which utilize radiant tube burners as the process heat source.

It is known that there are two basic sources of NOX formation, mainly from the nitrogen in the air and further from fuel bound nitrogen. The probable use of newly available synfuels which contain large amounts of combined nitrogen as well as the increase in the need to conserve energy further increases the demand for low NOX emissions.

Various forms of staged combustion and lower flame temperatures have been employed with conventional burners to reduce NOX emissions. Moreover, various forms of apparatus have been utilized to vitiate combustion air with products of combustion to lower flame temperature. One such apparatus is disclosed in Japanese Laid Open Patent Application Number 52-44805 wherein a portion of the products of combustion flowing in an exhaust leg are caused to be mixed outside the furnace with the combustion air supplied to the burner. Another such apparatus is illustrated in Japanese Laid Open Patent Application Number 56-12904 wherein a recuperator is positioned in a stream of products of combustion. Combustion air is directed inside the recuperator to be heated by heat transferred to the tube by the products of combustion. The heated air is then mixed outside the furnace with a portion of the products of combustion. The mixture is then supplied to the burner leg for combustion.

There remains a need for a radiant tube burner assembly which efficiently reduces NOX emissions.

SUMMARY OF THE INVENTION

Disadvantages of the prior art are reduced or overcome by an apparatus and method for reducing NOX formation in a radiant tube apparatus according to the present invention.

In one embodiment of the invention, the radiant tube burner assembly includes a radiant tube that includes a burner leg and an exhaust leg, a burner positioned in the burner leg, an exhaust for discharging products of combustion, a fuel inlet for the burner and a duct for conveying air mixed with products of combustion to the burner. The recuperator includes a first outer air tube contained inside the exhaust leg so that a first annular passage for conveying products of combustion in a first direction is defined between the air tube and the exhaust leg of the radiant tube. The first outer air tube is connected to a source of air. A second inner mixing tube is contained inside the first outer air tube so that a second annular passage for conveying air in a second direction opposite the first direction is defined between the air tube and the mixing tube. The mixing tube is connected at one end to the duct and at the opposite end to the air tube. The air is heated through heat transfer from the products of combustion in the first passage. A restriction is located in the end of the mixing tube opposite the duct for restricting the flow of air from the air tube into the mixing tube. A conduit is disposed between the first passage in the exhaust leg and the inside of the mixing tube adjacent to the restriction.

The restriction functions as a jet pump to cause an increase in the velocity of the air flowing from the air tube to the mixing tube. The increase in velocity causes a difference in pressure between the inside of the mixing tube and the radiant tube exhaust leg whereby fluid inside the first passage is drawn via the conduit into the mixing tube adjacent to the restriction.

In another embodiment of the invention, a recuperative radiant tube apparatus for use with a furnace includes a burner leg projecting through the furnace wall and an exhaust leg projecting through the furnace wall. A connecting leg connects the end of the burner leg inside the furnace and the end of the exhaust leg inside the furnace and a duct connects the end of the burner leg outside the furnace and the end of the exhaust leg outside the furnace. A recuperator is disposed inside the exhaust leg. The recuperator includes a first tube disposed in the exhaust leg and forming an exhaust passage between the exhaust leg and the first tube. The first tube has a first end positioned adjacent to the duct end of the exhaust leg and a second end opposite the first end and extending toward the connecting leg. A first port connects the inside of the first tube adjacent to the duct end thereof to a source of combustion air. A second tube is disposed in the first tube and forms an air passage between the first tube and the second tube. The second tube connects the inside of the duct to the end of the first tube opposite the duct. A jet pump is positioned at the end of the second tube opposite the duct end thereof for increasing the velocity of combustion air flowing from the first tube into the second tube. At least one second port adjacent to the jet pump end of the second tube connects the inside of the second tube to the exhaust passage. The second port provides a path for a portion of the products of combustion flowing in the exhaust leg to enter into the second tube wherein the portion is mixed with combustion air and the mixture is provided to the burner leg through the duct.

The first end of the first tube is positioned outside the furnace. The second end of the first tube and the jet pump end of the second tube can be positioned inside or outside the furnace. The burner leg has a fuel inlet for introducing fuel into the radiant tube and an ignitor for igniting the combination of the fuel and the combustion air thereby generating heat and creating products of combustion. The exhaust leg includes an exhaust port for exhausting the products of combustion which are not induced to flow into the second tube. The jet pump and the second port are formed in a mixing baffle disposed on the second end of the first tube.

In yet another embodiment of the invention, a radiant tube assembly for use in a furnace includes a burner tube, an exhaust tube and a recuperator positioned in the exhaust tube and in a stream of products of combustion flowing from the burner tube into the exhaust tube. The recuperator has an air intake port for introducing combustion air into the recuperator and a hot end positioned upstream of the air intake port in the stream of products of combustion. A mixing baffle is positioned at the hot end of the recuperator to mix a portion of the products of combustion with the combustion air and to direct the mixture to the burner tube.

The mixing baffle can be positioned inside or outside the furnace and the air port is positioned outside the furnace. A connecting leg connects the burner tube to the exhaust tube inside the furnace and a duct connects the burner tube to the exhaust tube outside the furnace.

The recuperator includes an air tube that is positioned inside the exhaust tube and forms an exhaust passage therebetween for the products of combustion flowing in a first direction. A mixing tube is positioned inside the air tube and forms an air passage for combustion air to flowing in a second direction opposite the first direction. The mixing baffle is positioned between the air passage and the inside of the mixing tube and has a plurality of radial ports extending outwardly to the exhaust passage. The mixing baffle includes a restriction between the air passage and the inside of the mixing tube. The restriction causes a reduction in pressure in the mixing tube during operation of the radiant tube assembly. The reduction of pressure causes a portion of the products of combustion in the exhaust passage to be introduced through the radial ports into the mixing baffle to be mixed with the combustion air. The mixing baffle then causes the mixture to flow in the first direction toward the burner through the mixing tube.

Finally, in the method according to the invention, air and fuel are combusted to produce a stream of products of combustion at an elevated temperature that flows in an exhaust leg. The stream is directed to a hot end of a recuperator tube. A flow of air is directed in the recuperator tube from an end opposite the hot end to the hot end. The air is heated by heat transfer through the recuperator tube from the stream of products of combustion. At the hot end of the recuperator tube the direction of the air flow is reversed, the velocity of the air flow is increased and a portion of the products of combustion is mixed with the heated air. This mixture is conveyed to the burner leg for combustion with fuel.

Air in the recuperator tube flows in a direction opposite the direction of the stream of products of combustion. Reversing the direction of the air flow causes the air to flow in the same direction as the stream of products of combustion.

An advantage of the present invention is that it provides a recuperator that vitiates combustion air with products of combustion, or flue gases, as the flue gases enter the recuperator and prior to the flue gases giving up heat to the recuperator. This results in the efficient preheating of the combustion air.

Another advantage of the present invention is that it provides a balanced recuperator that does not have more mass flowing on the products of combustion side than on the air side.

Yet another advantage of the present invention is that is provides a concentric jet pump in a recuperator that is more effective in inducing mass flow and air static energy recovery.

Still further advantages of the present invention will become apparent to those of ordinary skill in the art upon reading and understanding the following detailed description of the drawings wherein like reference characters identify like parts.

DETAILED DESCRIPTION OF THE PREFERRED EMBODIMENT

Figure 1:
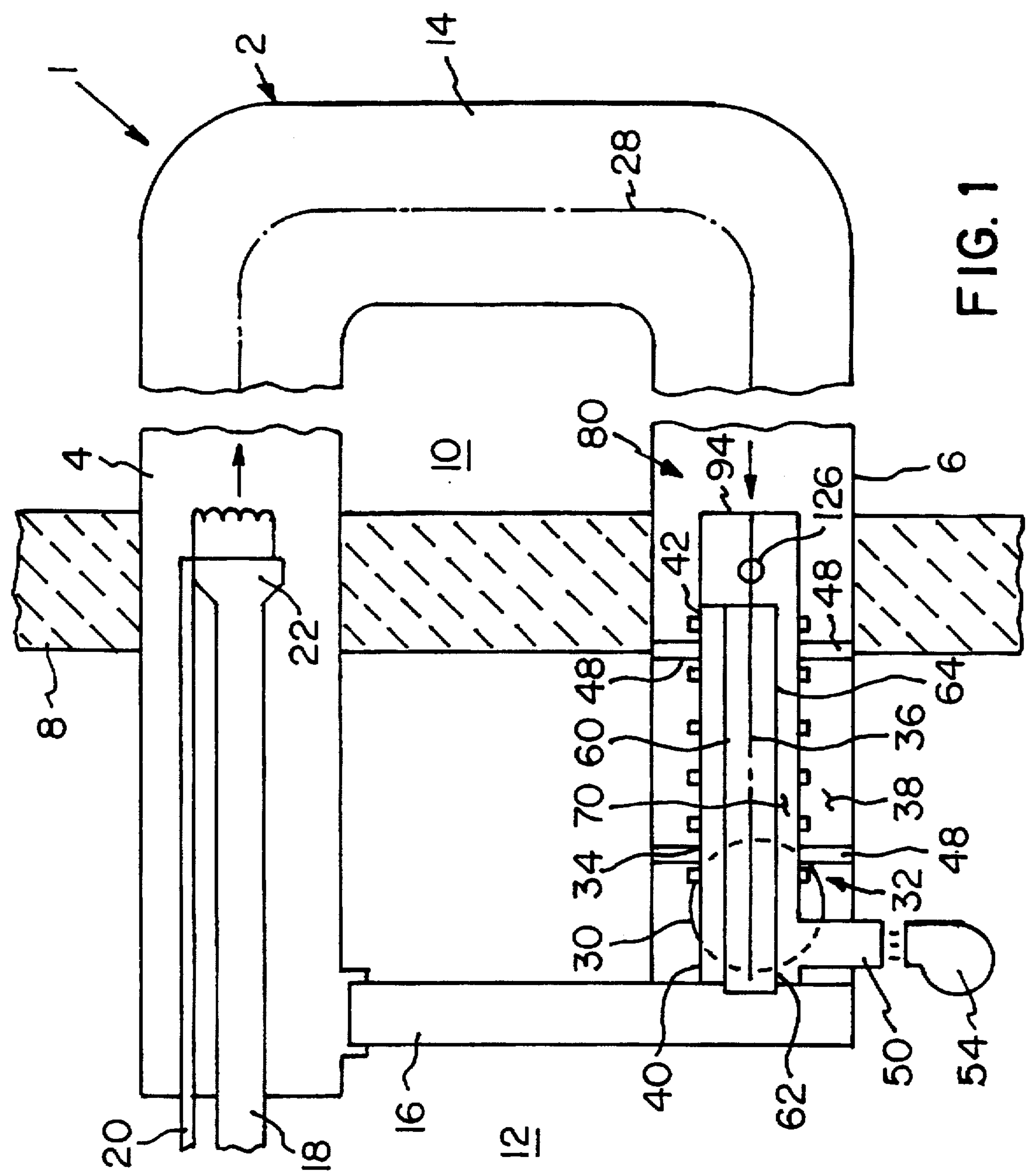
FIG. 1 is a broken plan view of a radiant tube assembly showing a recuperator in accordance with the present invention.

With reference to FIG. 1 of the drawings, a U-shaped radiant tube heater assembly 1 includes a radiant tube 2 including a burner tube or leg 4 and an exhaust tube or leg 6. The burner leg 4 and the exhaust leg 6 extend through a furnace wall 8 defining the inside 10 and the outside 12 of a furnace. A connecting tube or leg 14 disposed on the inside 10 of the furnace connects the inner end of the burner leg 4 to the inner end of the exhaust leg 6. A plenum or duct 16 disposed on the outside 12 of the furnace connects the outer end of the burner leg 4 to the outer end of the exhaust leg 6.

The burner leg 4 of the radiant tube 2 has a fuel tube 18 for providing a fuel, such as oil or gas, into the radiant tube 2 and an ignitor 20 for igniting the fuel provided by the fuel tube 18. A flame stabilizer 22 is positioned at the discharge end of the fuel tube 18 for distributing combustion air uniformly around the stream of fuel. The flame stabilizer 22 also creates a partial vacuum between the stream of fuel and the stream of combustion air to promote flame stability. The ignition of fuel and air in the burner leg 4 of the radiant tube 2 produces a stream of products of combustion 28 that flow from the burner leg 4, to the exhaust leg 6 via the connecting leg 14. The exhaust leg 6 of the radiant tube 2 is connected to an exhaust port 30 (shown in phantom) adjacent to the outer end thereof for exhausting the products of combustion 28 to the atmosphere.

Figure 2:
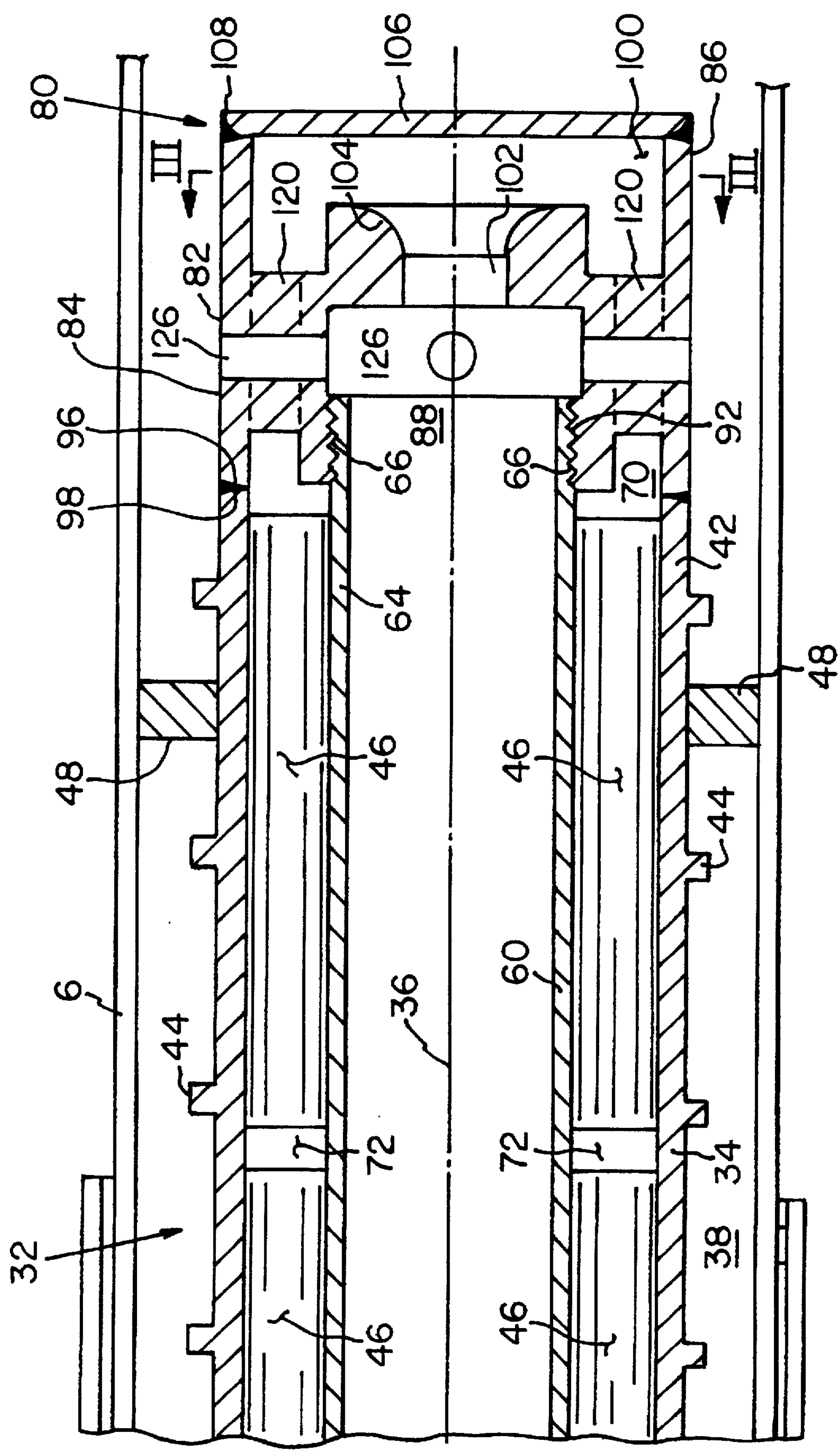
FIG. 2 is a longitudinal section of the recuperator of FIG. 1.

With reference to FIG. 2 and continuing reference to FIG. 1 of the drawings, a recuperator 32 is positioned inside the exhaust leg 6 and is utilized to mix part of the products of combustion 28 with combustion air and to provide the mixture to the burner leg 4 for combustion therein. The recuperator 32 includes a first outer tube or air tube 34, positioned substantially concentric with the central axis 36 of the exhaust leg 6 so that an annular exhaust passage or first annulus 38 is formed therebetween for the products of combustion 28 to flow to the exhaust port 30. The air tube 34 has a first outer end 40 forming a fluid tight connection with the plenum 16 and a second inner or hot end 42. In a preferred embodiment, a plurality of annular heat transfer fins 44 are formed on the outside of the air tube 34 and extend radially into the annular exhaust passage 38. Alternatively, the outside of the air tube 34 could have a plurality of continuous longitudinal ribs extending parallel to the central axis. Alternatively, the ribs could be interrupted along their length and staggered around the circumference of the air tube 34. In yet another alternative, no ribs or fins are provided on the outside of the air tube 34. The fins 44 promote the transfer of heat from the products of combustion 28 flowing in the exhaust passage 38 to combustion air in the air tube 34. Standoffs 48 are provided between the air tube 34 and the exhaust leg 6 to maintain the spacing therebetween.

An air intake port 50 is positioned adjacent the first end 40 of the air tube 34 and connects the inside of the air tube 34 to a source of combustion air outside of the exhaust leg 6. A fan 54 positioned outside the exhaust leg 6 may be utilized to introduce combustion air into the air intake port 50.

A second inner tube or mixing tube 60 is positioned inside of the air tube 34 and has a first outer end 62 that projects through the first end 40 of the air tube 34 and opens into the plenum 16 and a second inner or hot end 64 positioned adjacent to the hot end 42 of the air tube 34. The outside diameter of the hot end 64 of the mixing tube 60 has external threads 66 for a reason described hereinafter. The inside of the mixing tube 60 provides a path for fluid to flow from the hot end 64 of the mixing tube 60 to the plenum 16. A fluid tight seal is formed at the connection of the first end 62 of the mixing tube 60 and the plenum 16. The mixing tube 60 is disposed substantially concentric with the central axis 36 of the exhaust leg 6 and is positioned so that an annular air passage or second annulus 70 is formed between the mixing tube 60 and the air tube 34. A plurality of longitudinal ribs 46 extend parallel to the central axis 36 and radially between the air tube 34 and the mixing tube 60. In a preferred embodiment, the longitudinal ribs 46 are staggered along their length so that longitudinal gaps 72 separate longitudinally adjacent ribs 46. Alternatively, no ribs or fins are provided between the air tube 34 and the mixing tube 60.

A mixing baffle 80 is positioned at the hot end 42 of the air tube 34 to enable the mixing of combustion air and the products of combustion 28 and for providing the mixture to the mixing tube 60. The mixing baffle 80 has a cylindrical body 82 that has a first end 84 positioned adjacent the hot end 42 of the air tube 34 and the hot end 64 of the mixing tube 60, and a second end 86 positioned at the upstream end of the recuperator 32 in products of combustion 28.

The first end 84 of the mixing baffle 80 has a cylindrical cavity 88 formed therein. The cylindrical cavity 88 includes threads 92 formed on a portion of the inside diameter thereof for threadedly mating with the threads 66 formed on the mixing tube 60. The first end 84 of the mixing baffle 80 has an annular rim 96 for contacting an annular rim 98 on the hot end 42 of the air tube 34 when the mixing baffle 80 is threadedly engaged on the mixing tube 60. The mixing baffle 80 is secured to the hot end 42 of the air tube 34 by welding annular rim 96 to annular rim 98 to form a fluid tight seal therebetween. In this manner, the position of the mixing baffle 80 is fixed with respect to the hot end 42 of the air tube 34 and the hot end 64 of the mixing tube 60.

The second end 86 of the mixing baffle 80 has a cup-shaped cavity 100 formed therein concentric with the central axis 36. The mixing baffle 80 has a central bore 102 formed therein concentric with the central axis 36. The mixing baffle 80 also has a frusto-conical transition passage 104 providing a graduated passage between the cup-shaped cavity 100 and the central bore 102. In a preferred embodiment, the transition passage 104 is beveled or has a radius to provide for a more uniform transition between the cup-shaped cavity 100 and the central bore 102. However, this is not to be construed as limiting the invention. In accordance with the present invention, the central bore 102 is smaller in cross-section than the cylindrical cavity 88 and the cup-shaped cavity 100 to restrict the flow of air therebetween. The mixing baffle 80 includes a circular cover 106 secured in a suitable manner, such as welding, to an annular rim 108 at second end 86 of the mixing baffle 80 so that a fluid tight seal is formed therebetween.

Figure 3:
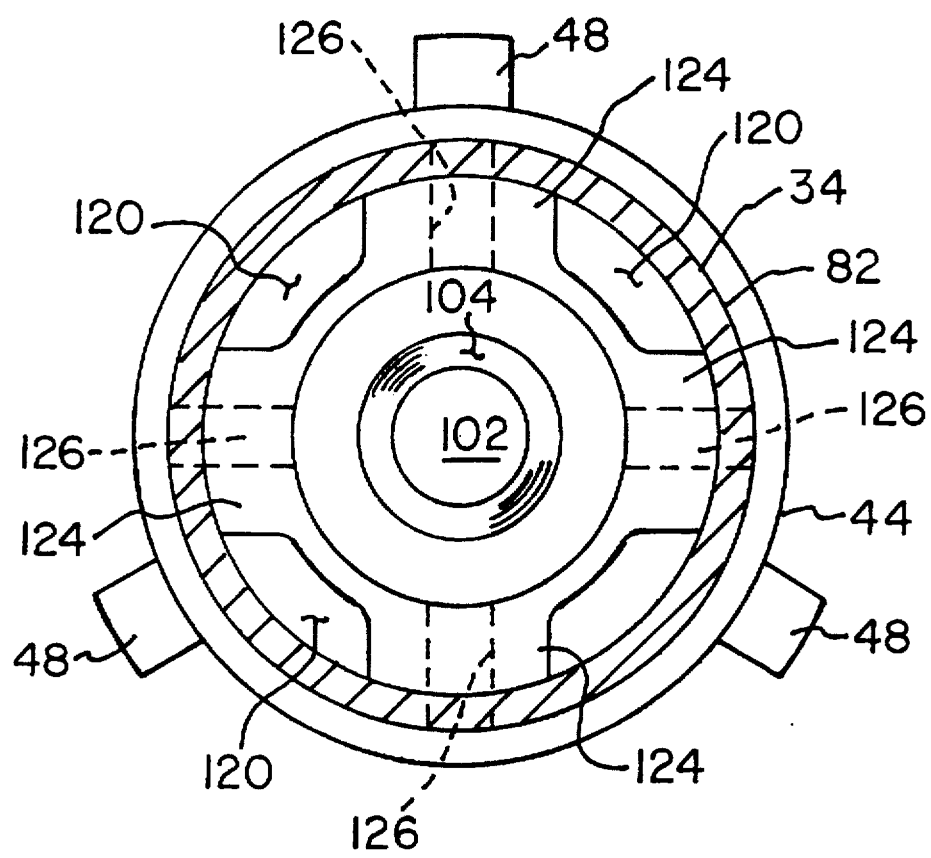
FIG. 3 is a section on line III—III of FIG. 2.

With reference to FIG. 3, and with continuing reference to FIGS. 1 and 2 of the drawings, the mixing baffle 80 includes one or more longitudinal channels 120 located radially outward of and parallel to central bore 102. The channels 120 provide communication between the cup-shaped cavity 100 and the annular air passage 70. Radial members 124 separate adjacent channels 120. The members 124 have one or more radial bores or conduits 126 formed therein (shown in phantom in FIG. 3) extending between the outside of the cylindrical body 82 and the cylindrical cavity 88 adjacent to the central bore 102.

In operation, the combustion of air and fuel in the burner leg 4 produces a stream of products of combustion or flue gases 28 that flows from the burner leg 4 to the annular exhaust passage 38, flowing in a first direction in passage 38 and exiting exhaust port 30. The products of combustion 28 contacting the outside surfaces of the mixing baffle 80 and the air tube 34 convey heat thereto.

The combustion of air and fuel in the burner leg 4 also forces or draws combustion air into the air intake port 50, through the annular air passage 70 toward the mixing baffle 80. The flow of combustion air from the air intake port 50 to the mixing baffle 80 is opposite to the direction of flow of the exhaust gases. Combustion air entering the mixing baffle 80 flows through the one or more channels 120 in the mixing baffle 80 into the cup-shaped cavity 100. Air entering the cup-shaped cavity 100 is directed toward the cone shaped transition 104 and the central bore 102. The air flowing from the air intake port 50 to the central bore 102 is progressively heated by heat obtained from the air tube 34 and the mixing baffle 80. In accordance with the present invention, the mixing baffle 80 causes the direction of the air flow to be reversed so that the air is directed through the central bore 102 which directs the air along the air tube 60 toward the first end 40 of the air tube 34.

The flow of air between the cup-shaped cavity 100 and the air tube 60 is restricted by the central bore 102 which acts as a jet pump to increase the velocity of the air passing therethrough. This increase in velocity causes a reduction in the pressure of the combustion air which creates a negative pressure with respect to the pressure of the products of combustion 28 flowing through the exhaust passage 38. This negative pressure draws products of combustion 28 into the cylindrical cavity 88 from the annular passage 38 through the radial bores 126 for mixing with the heated air. This vitiated mixture flows through the mixing tube 60 and into plenum 16 which supplies it to the burner leg 4 for combustion therein.

It has been determined that providing a vitiated mixture in the range of about 18–19% oxygen to the burner leg 4 reduces NOX emissions to a desirable level. To this end, the diameter of the central bore 102 and the diameter of the radial bores 126 are selected so that a desired quantity of products of combustion 28 is mixed with the combustion air to provide a vitiated mixture in the range of about 18% oxygen. It is to be appreciated that the NOX emissions can be adjusted by appropriate selection of the diameter of the central bore 102 and the diameter of the radial bores 126.

In a preferred embodiment, the air tube 34 and the mixing baffle 80 are formed from suitable heat resistant material such as, without limitation, HE 28-10 stainless steel or ceramic.

In the above described embodiment, the cooperation of the air tube 34 and the exhaust leg 6 forms an annular exhaust passage 38 and the cooperation of the mixing tube and the air tube forms an annular air passage 70. It will be appreciated, however, that the annular shapes of the exhaust passage and the air passage may be replaced by other suitable shapes without departing from the invention.

The invention has been described with reference to the preferred embodiment. Obvious modifications and alterations will occur to others upon reading and understanding the preceding detailed description. It is intended that the invention be construed as including all such modifications and alterations insofar as they come within the scope of the appended claims and all equivalents thereof.

I claim:

1. A recuperator for a radiant tube burner assembly having a radiant tube with a burner leg and an exhaust leg, a burner positioned in the burner leg, an exhaust port for discharging products of combustion from the exhaust leg, a fuel inlet for the burner and an air duct for conveying air mixed with products of combustion to the burner, said recuperator comprising:

a first outer air tube located within and radially spaced from said exhaust leg forming a first annular passage for conveying products of combustion in a first direction, said air tube having an outer end connected to a source of air and an inner end;

a second inner mixing tube located within and radially spaced from said first outer air tube forming a second annular passage for conveying air in a second direction opposite said first direction and having an outer end and an inner end, the said outer end of said inner mixing tube in fluid communication with said air duct and said inner end in fluid communication with said air tube;

restriction means located at said inner end of said mixing tube for restricting the flow of air passing from said air tube into said mixing tube; and conduit means disposed adjacent to said restriction means for providing fluid communication between said first annular passage in said exhaust leg and said mixing tube;

whereby said restriction means causes an increase in velocity of air flowing therethrough from said air tube to said mixing tube and the increase in velocity causes a pressure differential between said mixing tube and said exhaust leg to draw products of combustion from said first annular passage into said mixing tube through said conduit means.

2. A recuperator as set forth in claim 1 wherein said air tube and said exhaust leg are substantially concentric.

3. A recuperator as set forth in claim 1 wherein said air tube has one of a plurality of outwardly extending annular fins in said first annular passage and a plurality of longitudinally extending ribs in said first annular passage, wherein said longitudinally ribs are at least one of continuous, interrupted and staggered.

4. A recuperator as set forth in claim 1 further including a longitudinally extending rib extending radially between said air tube and said mixing tube, wherein said longitudinally extending rib is at least one of continuous, interrupted and staggered.

5. A recuperator as set forth in claim 1 wherein the mixing tube and the air tube are substantially concentric.

6. A recuperative radiant tube apparatus for use with a furnace having a furnace wall defining an inside and an outside of said furnace, said recuperative radiant tube apparatus including:

a burner leg projecting through said furnace wall and having an end inside furnace and an end outside said furnace;

an exhaust leg projecting through said furnace wall having an end inside side furnace and an end outside said furnace;

a connecting leg connecting said end of said burner leg inside said furnace and said end of said exhaust leg inside said furnace;

a duct operatively connecting said end of said burner leg outside said furnace and said end of said exhaust leg outside said furnace; and a recuperator disposed inside said exhaust leg, said recuperator comprising:

a first tube disposed in and radially spaced from said exhaust leg forming an annular exhaust gas passage between said exhaust leg and said first tube, said first tube having an outer end positioned adjacent said end of said exhaust leg outside said furnace and an inner end opposite said outer end of said first tube and extending towards said connecting leg;

an inlet port adjacent said outer end of said first tube adapted to connect the inside of said first tube to a source of combustion air;

a second tube disposed in and radially spaced from said first tube and forming an annular air passage between said first tube and said second tube and having an outer end and an inner end, said annular air passage operatively connecting the source of combustion air to said inner end of said first tube;

means forming a jet pump at said inner end of said second tube for increasing the velocity of combustion air flowing from said first tube into said second tube; and at least one port means adjacent said means forming a jet pump connecting the inside of said second tube to said annular exhaust gas passage, said port means providing a path for exhaust gas flowing in said annular exhaust gas passage to enter said second tube wherein said exhaust gas is mixed with combustion air, said duct conveying said mixture to said burner leg for combusting with fuel in said burner leg.

7. A recuperative radiant tube apparatus as set forth in claim 6 wherein said inner end of said first tube and said inner end of said second tube are positioned inside the furnace.

8. A recuperative radiant tube apparatus as set forth in claim 7 wherein the outer end of said first tube is positioned outside the furnace.

9. A recuperative radiant tube apparatus as set forth in claim 8 wherein said burner leg has a burner located therein, a fuel inlet for introducing fuel to said burner and an ignitor for igniting the combination of fuel and said mixture of exhaust gas and air to generate heat and products of combustion.

10. A recuperative radiant tube apparatus as set forth in claim 6 wherein said exhaust leg includes an exhaust port for exhausting products of combustion.

11. A recuperative radiant tube apparatus as set forth in claim 6 wherein said means forming a jet pump and said port means are formed in a mixing baffle disposed on said inner end of said first and second tubes.

12. A method of reducing NOX formation in a radiant tube apparatus having a burner leg and an exhaust leg and including a recuperator having a hot end, said method comprising the steps of:

combusting air and fuel to produce a stream of products of combustion at an elevated temperature;

passing said stream to said exhaust leg;

directing said stream to said hot end of said recuperator tube;

directing a flow of air in said recuperator tube from an end opposite said hot end to said hot end and heating said air by heat transfer from said products of combustion stream through said recuperator tube;

reversing the direction of air flow at said hot end of said recuperator tube;

increasing the velocity of said heated air at said hot end of said recuperator tube;

mixing a portion of the products of combustion with said heated air at said hot end of said recuperator tube; and conveying said mixture from said recuperator tube to said burner leg for combustion with said fuel.

13. A method as set forth in claim 12 wherein the air directed in said recuperator tube flows in a direction opposite the direction of flow of said stream of products of combustion in said recuperator tube.

14. A method as set forth in claim 13 wherein the step of reversing the direction of the air flow causes the air to flow through said recuperator tube in the same direction as said stream of products of combustion.

15. A radiant tube assembly for use in a furnace, said radiant tube assembly including:

a burner tube;

an exhaust tube;

a recuperator positioned in said exhaust tube in a stream of products of combustion flowing from said burner tube through said exhaust tube, said recuperator including an inlet port for introducing combustion air to said recuperator, said recuperator having a hot end positioned in the stream of products of combustion upstream of said inlet port; and a mixing baffle positioned at said hot end of said recuperator for mixing a portion of the products of combustion with air and directing said mixture toward said burner tube, wherein:

the stream of products of combustion and the mixture of air and a portion of the products of combustion flow in a first direction; and the combustion air flows in a second direction opposite the first direction.

16. A radiant tube assembly for use in a furnace, said radiant tube assembly including:

a burner tube;

an exhaust tube;

a recuperator positioned in said exhaust tube in a stream of products of combustion flowing from said burner tube through said exhaust tube, said recuperator including an inlet port for introducing combustion air to said recuperator, said recuperator having a hot end positioned in the stream of products of combustion upstream of said inlet port; and a mixing baffle positioned at said hot end of said recuperator for mixing a portion of the products of combustion with air and directing said mixture toward said burner tube, wherein said mixing baffle is positioned inside a furnace and said inlet port is positioned outside the furnace.

17. A radiant tube assembly as set forth in claim 16 further including a connecting leg located inside the furnace connecting said burner tube to said exhaust tube and a duct outside the furnace connecting said burner tube to said recuperator.

18. A radiant tube assembly for use in a furnace, said radiant tube assembly including:

a burner tube;

an exhaust tube;

a recuperator positioned in said exhaust tube in a stream of products of combustion flowing from said burner tube through said exhaust tube, said recuperator including an inlet port for introducing combustion air to said recuperator, said recuperator having a hot end positioned in the stream of products of combustion upstream of said inlet port; and a mixing baffle positioned at said hot end of said recuperator for mixing a portion of the products of combustion with air and directing said mixture toward said burner tube, wherein said recuperator includes:

an air tube positioned inside said exhaust tube and forming an exhaust passage therebetween wherein products of combustion flow in a first direction; and a mixing tube positioned inside said air tube and forming an air passage therebetween wherein combustion air flows in a second direction opposite the first direction, wherein said mixing baffle is positioned between said air passage and the inside of said mixing tube for causing said mixture to flow in the first direction to said burner tube through said mixing tube.

19. The radiant tube assembly as set forth in claim 18 wherein said mixing baffle means includes a restriction member between said air passage and the inside of said mixing tube, a plurality of radial ports in said mixing baffle means extending outward to said exhaust passage, said restriction member causing a reduction in air pressure between said air passage and said mixing tube during operation of the radiant tube assembly, whereby the reduction in air pressure causes a portion of the products of combustion in said exhaust passage to be drawn through said radial ports into said mixing tube and mixed with the combustion air.

20. The radiant tube as set forth in claim 18 wherein said air tube includes:

at least one of an annular heat exchange fin and a longitudinal rib extending radially outwardly therefrom; and at least one longitudinal rib extending radially inwardly therefrom, wherein the one of said outwardly extending annular heat exchange fins and longitudinal rib and said inwardly extending rib transfer heat from products of combustion to air passing through said air tube.

21. The radiant tube as set forth in claim 20 wherein at least one of the outwardly extending rib and the inwardly extending rib are one or more of continuous, interrupted and staggered.

* * * * *